United States Patent
Calvo Alonso et al.

(10) Patent No.: US 9,007,279 B2
(45) Date of Patent: Apr. 14, 2015

(54) CONTROLLING ONE OR MORE DISPLAYS

(75) Inventors: Vicente Calvo Alonso, Piispanristi (FI); Oiva Arvo Oskari Sahlsten, Salo (FI)

(73) Assignee: Nokia Corporation, Espoo (FI)

( * ) Notice: Subject to any disclaimer, the term of this patent is extended or adjusted under 35 U.S.C. 154(b) by 212 days.

(21) Appl. No.: 13/473,111

(22) Filed: May 16, 2012

(65) Prior Publication Data
US 2013/0307877 A1 Nov. 21, 2013

(51) Int. Cl.
*G09G 5/00* (2006.01)
*G06F 3/14* (2006.01)

(52) U.S. Cl.
CPC ........ *G06F 3/1446* (2013.01); *G09G 2300/026* (2013.01)

(58) Field of Classification Search
CPC ... G09G 5/227; G09G 5/391; G09G 2340/04; G09G 2340/0407; G09G 2340/0414; G09G 2340/0421; G09G 2340/0428; G09G 2340/0464; G09G 2340/0471; G09G 2340/0478; G09G 2340/0485; G09G 2300/02–2300/026; G06F 3/1431–3/1446
USPC .......... 345/1.3, 3.1–3.4, 204–699; 353/30, 48
See application file for complete search history.

(56) References Cited

U.S. PATENT DOCUMENTS

| | | | |
|---|---|---|---|
| 5,838,405 A | 11/1998 | Izumi et al. | 349/73 |
| 6,583,771 B1 * | 6/2003 | Furuhashi et al. | 345/1.1 |
| 6,816,171 B2 * | 11/2004 | Kim | 345/699 |
| 7,777,691 B1 | 8/2010 | Nimmer et al. | 345/1.3 |
| 2002/0015052 A1 * | 2/2002 | Deering | 345/647 |
| 2008/0079656 A1 | 4/2008 | Kee et al. | 345/1.3 |
| 2009/0109125 A1 * | 4/2009 | Young et al. | 345/1.3 |
| 2010/0321382 A1 * | 12/2010 | Amaratunga et al. | 345/419 |

FOREIGN PATENT DOCUMENTS

CN 101256762 A 9/2008

* cited by examiner

*Primary Examiner* — Liliana Cerullo
(74) *Attorney, Agent, or Firm* — Harrington & Smith (57) ABSTRACT

An apparatus including at least a first display including display pixels arranged as a first plurality of lines of display pixels; and a display controller configured to control display of an image by mapping at least a portion of the image to lines of display pixels of the first display. The display controller is configured to operate in a first mode or a second mode. In the first mode the display controller is configured to map images including N lines of image pixels to a first sub-set of the first plurality of lines of display pixels, including N lines of display pixels, and in the second mode the display controller is configured to map images including N lines of image pixels to a second sub-set of the first plurality of lines of display pixels, including N lines of display pixels. The second sub-set is offset from the first sub-set.

19 Claims, 9 Drawing Sheets

CONTROLLING ONE OR MORE DISPLAYS

TECHNOLOGICAL FIELD

Embodiments of the present invention relate to controlling a display. In particular, they relate to mapping an image to one or more displays.

BACKGROUND

A display controller may be used to display one or more images on a display. The display controller is typically configured to map image pixels from the image to display pixels of the display such that the display renders the image.

BRIEF SUMMARY

According to various, but not necessarily all, embodiments of the invention there is provided an apparatus comprising: at least a first display comprising display pixels arranged as a first plurality of lines of display pixels; and a display controller configured to control display of an image by mapping at least a portion of the image to lines of display pixels of the first display, wherein the display controller is configured to operate in at least a first mode or a second mode, wherein in the first mode the display controller is configured to map images comprising N lines of image pixels to a first sub-set of the first plurality of lines of display pixels, comprising N lines of display pixels, and in the second mode the display controller is configured to map images comprising N lines of image pixels to a second sub-set of the first plurality of lines of display pixels, comprising N lines of display pixels, wherein the second sub-set of the first plurality of lines of display pixels is offset from the first sub-set of the first plurality of lines of display pixels.

According to various, but not necessarily all, embodiments of the invention there is provided a method comprising: reading a control parameter; and controlling display of an image by mapping at least a portion of the image to lines of display pixels of a first display comprising display pixels arranged as a first plurality of lines of display pixels using a mapping mode defined by the control parameter, wherein a first mapping mode, maps images comprising N lines of image pixels to a first sub-set of a first plurality of lines of display pixels, comprising N lines of display pixels, and a second mapping mode maps images comprising N lines of image pixels to a second sub-set of the first plurality of lines of display pixels, comprising N lines of display pixels, wherein the second sub-set of the first plurality of lines of display pixels is offset from the first sub-set of the first plurality of lines of display pixels.

According to various, but not necessarily all, embodiments of the invention there is provided an apparatus comprising: at least one processor; and at least one memory including computer program code the at least one memory and the computer program code configured to, with the at least one processor, cause the apparatus at least to perform: reading a control parameter; and controlling display of an image by mapping at least a portion of the image to lines of display pixels of a first display comprising display pixels arranged as a first plurality of lines of display pixels using a mapping mode defined by the control parameter, wherein a first mapping mode, maps images comprising N lines of image pixels to a first sub-set of a first plurality of lines of display pixels, comprising N lines of display pixels, and a second mapping mode maps images comprising N lines of image pixels to a second sub-set of the first plurality of lines of display pixels, wherein the second sub-set of the first plurality of lines of display pixels is offset from the first sub-set of the first plurality of lines of display pixels.

According to various, but not necessarily all, embodiments of the invention there is provided an apparatus comprising: at least a first display and a second display that are arranged or are configured to be arranged adjacent each other to form a combined display wherein the first display comprises display pixels arranged as a first plurality of lines of display pixels and the second display comprises display pixels arranged as a second plurality of lines of display pixels; and a display controller configured to control display of images on the combined display by simultaneously mapping a first portion of an image to lines of display pixels of the first display and mapping a second different portion of the image to lines of display pixels of the second display, wherein the display controller is configured to operate in a first mode or a second mode, wherein in the first mode the display controller is configured to map images comprising N lines of pixels to a first sub-set of the plurality of lines of pixels, comprising N lines of pixels and in the second mode the display controller is configured to map images comprising N lines of image pixels to a second sub-set of the plurality of lines of display pixels, comprising N lines of display pixels, wherein the second sub-set of the plurality of lines of display pixels is offset from the first sub-set of the plurality of display pixels.

BRIEF DESCRIPTION

For a better understanding of various examples of embodiments of the present invention reference will now be made by way of example only to the accompanying drawings in which.

DETAILED DESCRIPTION

The Figures illustrate an apparatus 2 comprising: at least a first display 10 comprising display pixels 12 arranged as a first plurality 18 of lines 14 of display pixels 12; and a display controller 4 configured to control display of an image 30 by mapping at least a portion of the image to lines 14 of display pixels 12 of the first display 10, wherein the display controller 4 is configured to operate in at least a first mode or a second mode, wherein in the first mode the display controller 4 is configured to map images comprising N lines of image pixels 32 to a first sub-set 16 of the first plurality 18 of lines 14 of display pixels 12, comprising N lines 14 of display pixels 12, and in the second mode the display controller 4 is configured to map images comprising N lines of image pixels 32 to a second sub-set 16' of the first plurality 18 of lines 14 of display pixels 12, comprising N lines of display pixels 12, wherein the second sub-set 16' of the first plurality 18 of lines 14 of display pixels 12 is offset from the first sub-set 16 of the first plurality 18 of lines 14 of display pixels 12.

Figure 1:
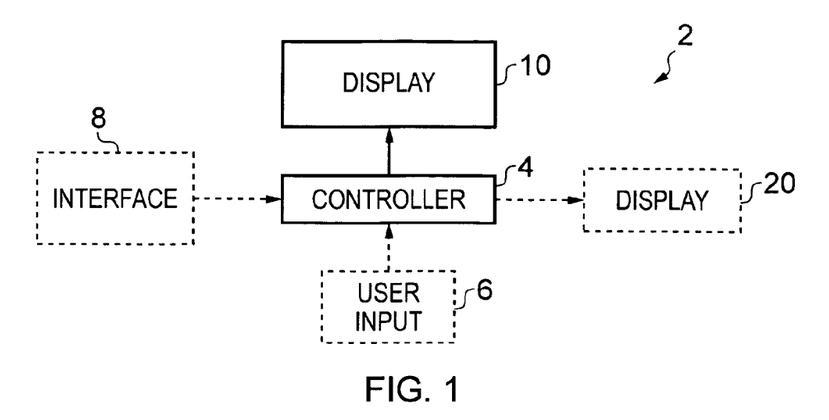
FIG. 1 illustrates an example of an apparatus.

FIG. 1 illustrates an example of an apparatus 2. The apparatus 2 comprises a display controller 4 and a first display 10. The display controller 4 is configured to control the output image provided by the first display 10.

The display controller 4 may, in some examples, also be configured to simultaneously control the output images provided by multiple displays including the first display 10. Some or all of the displays in addition to the first display 10 may be housed by the apparatus 2 and/or housed separately from the apparatus 2.

In some example, the apparatus 2 comprises only a single display, the first display 10. In other examples, the apparatus 2 comprises multiple displays, including the first display 10 and a second display 20. FIG. 1 illustrates using dotted lines a second display 20 as it may not be present. If present, the display controller 4 is configured to simultaneously control the output images provided by the first display 10 and the second display 20.

Figure 2A:
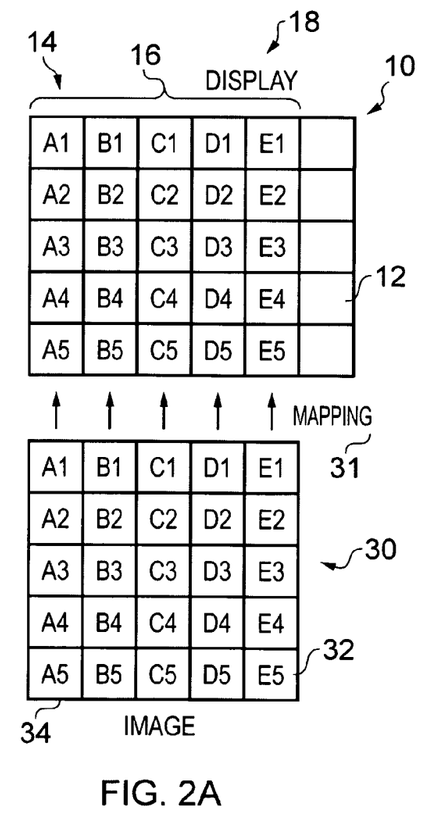
FIG. 2A illustrates an example of mapping an image to a display in accordance with a first mapping mode.
Figure 2B:
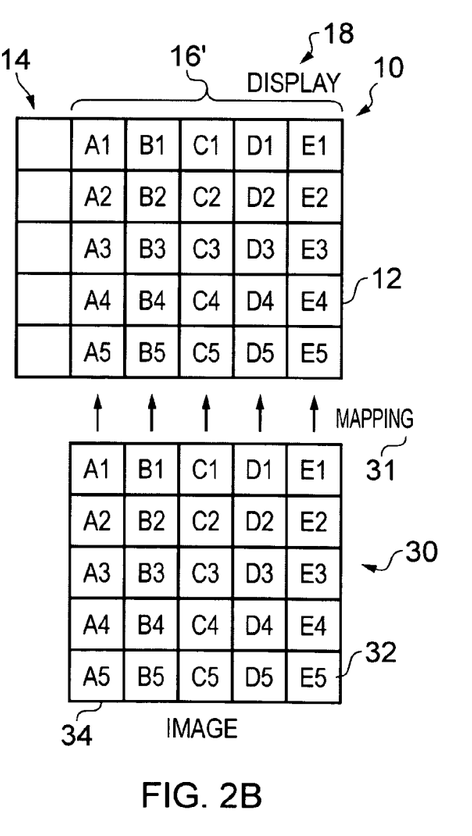
FIG. 2B illustrates an example of mapping an image to a display in accordance with a second mapping mode.

Referring to FIGS. 2A and 2B, the first display 10 comprises an array of display pixels 12 in rows and columns. In this example, the columns of pixels define a first plurality 18 of lines 14 of display pixels 12.

The display controller 4 is configured to control display of an image 30 by mapping 31 at least a portion of the image 30 to lines 14 of display pixels 12 of the first display 10.

The display controller 4 is configured to operate in a first mode or a second mode. FIG. 2A illustrates an example of the first mode. FIG. 2B illustrates an example of the second mode.

In the example illustrated in both FIGS. 2A and 2B, an image 30 has an N column by M row array of image pixels 32. In this example, the N columns of image pixels 32 define N lines 34 of image pixels 32. The first display 10, in this example, has an N+1 column by M row array of display pixels 12. In this example, the N+1 columns of display pixels 12 define N+1 lines 14 of display pixels 12.

In the first mode (FIG. 2A), the display controller 4 is configured to map 31 images 30 comprising N lines 34 of image pixels 32 to only a first sub-set 16 of the first plurality 18 of lines 14 of display pixels 12. In this example, the first plurality 18 of lines 14 of display pixels 12 has N+1 lines 14 of display pixels and the first sub-set 16 of the first plurality 18 of lines 14 of display pixels 12 has N lines 14 of display pixels.

In the second mode (FIG. 2B), the display controller 4 is configured to map 31 images 30 comprising N lines 34 of image pixels 32 to only a second sub-set 16' of the first plurality 18 of lines 14 of display pixels 12. In this example, the first plurality 18 of lines 14 of display pixels 12 has N+1 lines 14 of display pixels and the second sub-set 16' of the first plurality 18 of lines 14 of display pixels 12 has N lines 14 of display pixels.

The second sub-set 16' of the first plurality 18 of lines 14 of display pixels 12 is offset from the first sub-set 16 of the first plurality 18 of lines 14 of display pixels 12. In this example, the offset is by one pixel. Thus in FIG. 2A, the N+1 line 14 of display pixels 12 is unused but the preceding N lines 14 of display pixels 12 are used, whereas in FIG. 2B, the 1st line 14 of display pixels 12 is unused but the following N lines 14 of display pixels 12 are used.

It can be observed from FIGS. 2A and 2B that the N lines 34 of image pixels 32 of an image 30 displayed in the second mode (FIG. 2B) is offset from the N lines 34 of image pixels 32 of the image 30 displayed in the first mode (FIG. 2A).

Figure 3A:
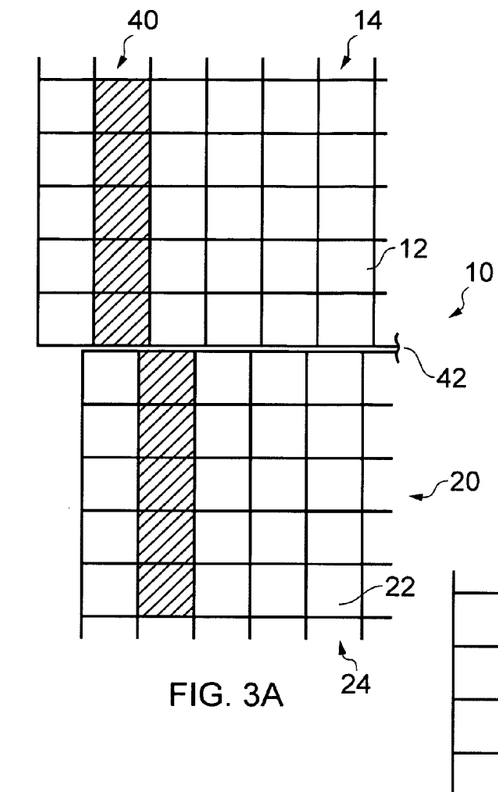
FIGS. 3A and 3B illustrate correction of display misalignment using the second mapping mode.
Figure 3B:
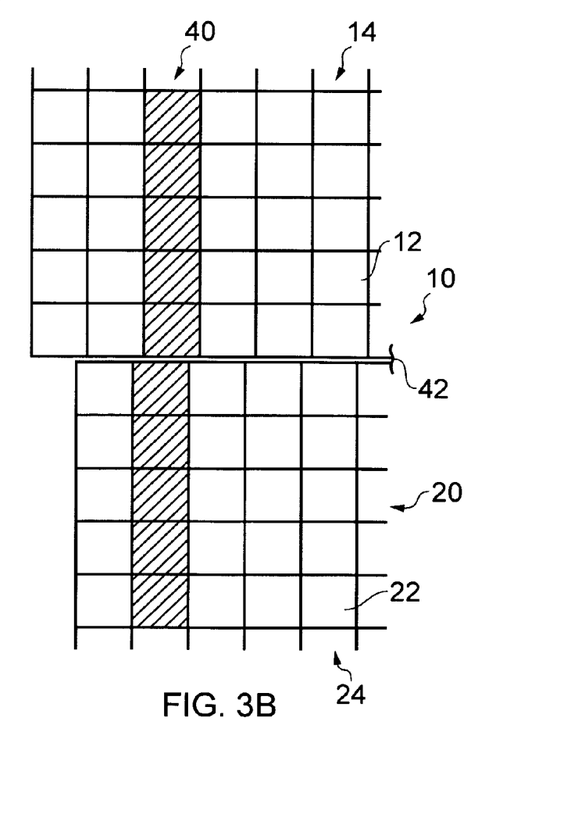

FIGS. 3A and 3B illustrate an embodiment where the apparatus 4 controls the first display 10 and also a second display 20. The display controller 4 simultaneously controls the output from the first display 10 and the second display 20.

The first display 10 is for use adjacent the second display 20. When adjacent, the first display 10 and the second display 20 form a combined display.

As previously described, the first display 10 comprises display pixels 12 arranged as a first plurality 18 of lines 14 of display pixels 12.

The second display 20 comprises display pixels 22 arranged as a second plurality of lines 24 of display pixels 22.

The first plurality and the second plurality may be the same or different.

The first display 10 and the second display 20 are arranged or are configured to be arranged adjacent each other to form a combined display. For example, the first display 10 and the second display 20 may be hinged for relative rotation about an interface 42 where the first display 10 and the second display 20 meet.

The first display comprises an edge that forms an interface 42 between the first display 10 and a second display 20. The first plurality of lines 14 of pixels 12 are orthogonal to the interface 42 and parallel to the second plurality of lines 24 of display pixels 22 of a second display 20. The first display 10 and the second display 20 are relatively displaced in a direction of the first plurality of lines 14 and the second plurality of lines 24.

The display controller 4 is configured to control display of images on the combined display by simultaneously mapping a first portion of an image to lines 14 of display pixels 12 of the first display 10 according to the first mode or the second mode and mapping a second different portion of the image to lines 24 of display pixels 22 of the second display 20.

FIG. 3A illustrates an example of the first mode. FIG. 3B illustrates an example of the second mode.

In the example illustrated in both FIGS. 3A and 3B, the first portion of an image comprises an N column by M row array of image pixels 32 as previously described with reference to FIGS. 2A and 2B. The N columns of image pixels 32 define N lines 34 of image pixels 32.

In the first mode the display controller 4 is configured to map images comprising N lines of image pixels to only a first sub-set of the first plurality of lines of display pixels. The first sub-set has N lines of display pixels.

In the second mode the display controller 4 is configured to map images comprising N lines of image pixels to only a second sub-set of the first plurality of lines of display pixels. The second sub-set has N lines of display pixels. The second sub-set of the first plurality of lines of display pixels is offset from the first sub-set of the first plurality of lines of display pixels.

The offset of the second sub-set of the first plurality of lines of display pixels from the first sub-set of the first plurality of lines of display pixels, maps image pixels (e.g. marker 40) that would have been mapped to a particular line 14 of display pixels 12 in the first mode (FIG. 3A) to a different line 14 of display pixels 12 in the second mode (FIG. 3B). As the image shift is applied only to the first display 10 and not the second display, the portion of the image in the first display shifts relative to the portion of the image displayed in the second display 20.

FIGS. 4A to 4E illustrate some examples of how the different modes of the display controller 4 may be used to correct for misalignment between the first display 10 and the second display 20.

As illustrated in the leftmost illustration in each of FIGS. 4A to 4E, the first display 10 and the second display 20 are misaligned to differing extents and in differing directions.

The misalignment is illustrated by using the display controller 4 in a default mode (e.g. the first mode) to display a straight line marker 40 simultaneously in both the first display 10 and the second display 20. The straight line marker 40 should appear, if the first display 10 and the second display 20 are correctly aligned, as a straight line in the combined display. However, because the first display 10 and the second display 20 are misaligned there is a discontinuity (step) in the straight line marker 40 at the interface between the first display 10 and the second display 20.

As illustrated in the rightmost illustration in each of FIGS. 4A to 4E, the misalignment between first display 10 and the second display 20 is compensated for by using the display controller 4, in a compensation mode (e.g. the second mode). The corrective effect is illustrated by displaying the same straight line marker 40 simultaneously in both the first display 10 and the second display 20. The discontinuity in the straight line marker 40 between the first display 10 and the second display 20 is significantly reduced and may not be visible to the human eye.

Figure 4A:
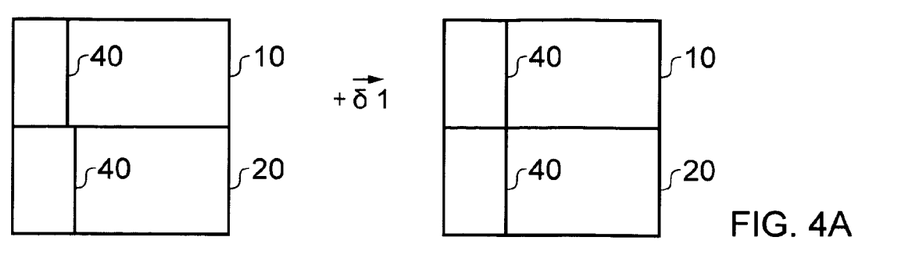
FIG. 4A to 4E illustrate different corrections of display misalignment using the second mapping mode with different offsets

In FIG. 4A, the first display 10 is above the second display 20. The leftmost illustration shows the combined display when the display controller 4 is in the first mode. The marker 40 in the first display 10 is offset to the left of the marker 40 in the lower second display 20. The rightmost illustration shows the combined display when the display controller 4 is in the second mode. The second sub-set 16' of the first plurality 18 of lines 14 of display pixels 12 has been offset in the second mode from the first sub-set 16 of the first plurality 18 of lines 14 of display pixels 12 in the first mode by a positive offset $+\delta 1$.

Figure 4B:
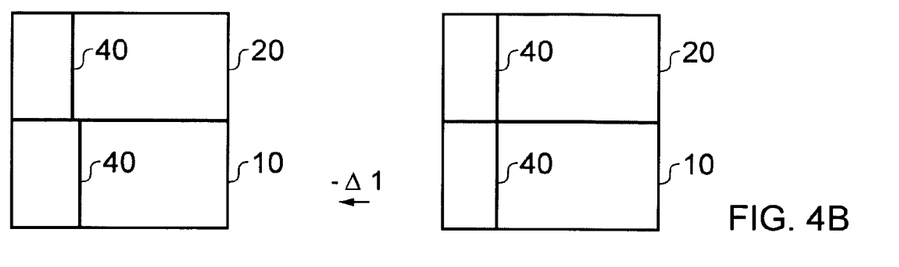

In FIG. 4B, the second display 20 is above the first display 10. The leftmost illustration shows the combined display when the display controller 4 is in the first mode. The marker 40 in the first display 10 is offset to the right of the marker 40 in the upper second display 20. The rightmost illustration shows the combined display when the display controller 4 is in the second mode. The second sub-set of the first plurality of lines of display pixels has been offset in the second mode from the first sub-set of the first plurality of lines of display pixels in the first mode by a negative offset $-\Delta 1$.

Figure 4C:
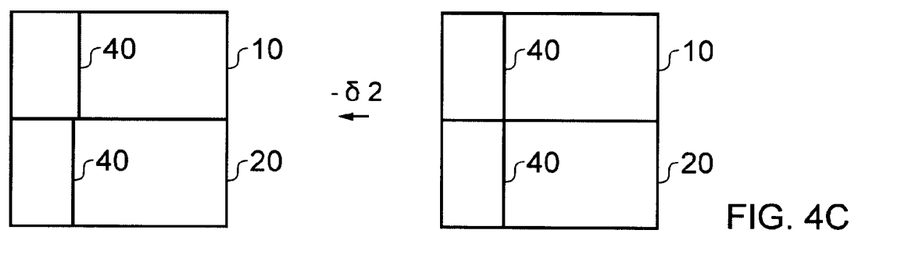

In FIG. 4C, the first display 10 is above the second display 20. The leftmost illustration shows the combined display when the display controller 4 is in the first mode. The marker 40 in the first display 10 is offset to the right of the marker 40 in the lower second display 20. The rightmost illustration shows the combined display when the display controller 4 is in the second mode. The second sub-set of the first plurality of lines of display pixels has been offset in the second mode from the first sub-set of the first plurality of lines of display pixels in the first mode by a negative offset $-\delta 2$.

Figure 4D:
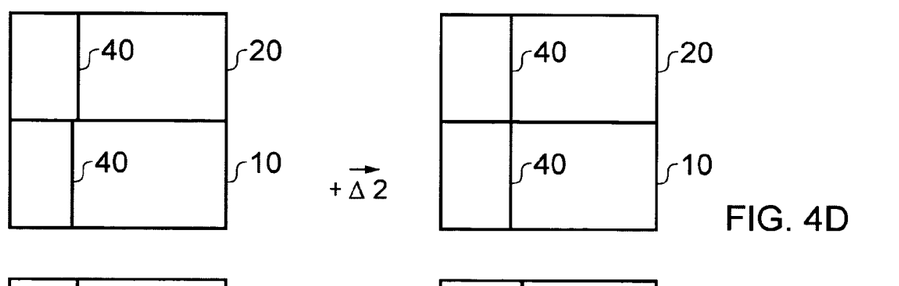

In FIG. 4D, the second display 20 is above the first display 10. The leftmost illustration shows the combined display when the display controller 4 is in the first mode. The marker 40 in the first display is offset to the left of the marker 40 in the upper second display 20. The rightmost illustration shows the combined display when the display controller 4 is in the second mode. The second sub-set of the first plurality of lines of display pixels has been offset in the second mode from the first sub-set of the first plurality of lines of display pixels in the first mode by a positive offset $+\Delta 2$.

Figure 4E:
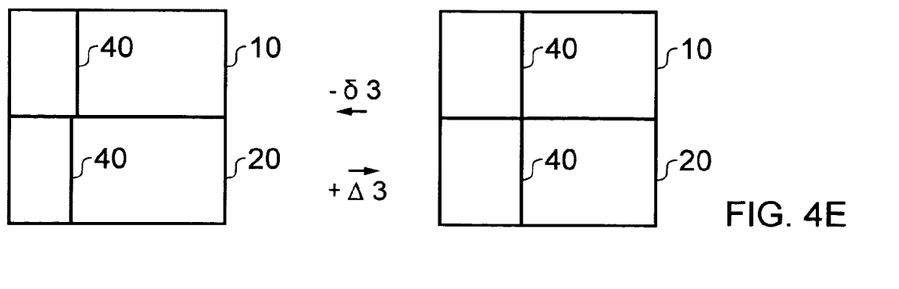

In FIG. 4E, the first display 10 is above the second display 20. In this embodiment, the display controller 4 can off-set the image displayed in the upper display, as illustrated for example in FIGS. 4A and 4C, and can simultaneously off-set the image displayed in the lower display, as illustrated for example in FIGS. 4B and 4D.

The leftmost illustration shows the combined display when the display controller 4 is in the first mode. The marker 40 in the upper display is offset to the right of the marker 40 in the lower display.

The rightmost illustration shows the combined display when the display controller 4 is in the second mode and the display controller 4 off-sets not only the image displayed in the upper first display 10 but also simultaneously off-sets the image displayed in the lower second display 20

The off-set applied to the image displayed in the upper first display 10 is a negative off-set $-\delta 3$.

The off-set applied to the image displayed in the lower second display 20 is a positive off-set $+\Delta 3$.

Referring to FIG. 4E, as previously described, the display controller 4 is configured to map a first portion of images 30 to a first sub-set 16 of the first plurality 18 of lines 14 of display pixels 12 of the first display 10 in the first mode and in the second mode the display controller 4 is configured to map a first portion of images 30 to a second sub-set 16' of the second plurality 18 of lines 14 of display pixels 12 of the first display 10. The second sub-set 16' of the first plurality of lines 14 of display pixels is offset from the first sub-set 16 of the second plurality of lines 14 of display pixels.

The display controller 4 is also configured to map a second portion of images 30 to a first sub-set of a second plurality of lines of display pixels of the second display 20 in the first mode and in the second mode the display controller 4 is configured to map a second portion of images to a second sub-set of the second plurality of lines of display pixels of the second display 20. The second sub-set of the second plurality of lines of display pixels is offset from the first sub-set of the second plurality of lines of display pixels. The first and second portions of the images are non-overlapping and contiguous together forming all of the image 30.

Figure 5A:
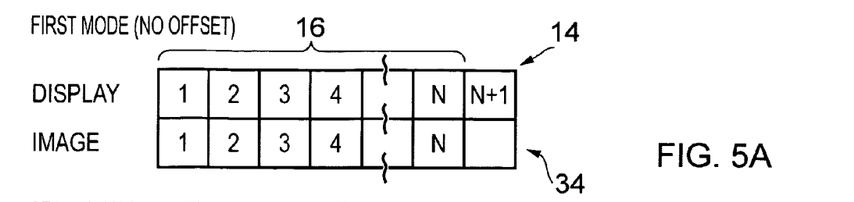
FIGS. 5A and 5B illustrate an example of mapping an image to a display in accordance with a first mapping mode and a second mapping mode.
Figure 5B:
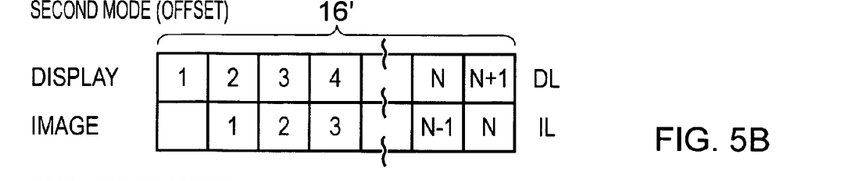

FIGS. 5A, 5B; 6A, 6B, 7A, 7B and 8A, 8B and 8C illustrate the different mappings used for the first mode (FIGS. 5A, 6A, 7A, 8A) and for the second mode (FIGS. 5B, 6B, 7B, 8B and 8C).

FIG. 5A, illustrates a mapping in the first mode of N lines 34 of image pixels to a first sub-set 16 of the first plurality of lines 14 of display pixels. In this example, the first plurality of lines 14 of display pixels has N+1 lines 14 of display pixels and the first sub-set 16 has N lines 14 of display pixels.

FIG. 5B, illustrates a mapping in the second mode of the N lines 34 of image pixels illustrated in FIG. 5A to a different second sub-set 16' of the first plurality of lines 14 of display pixels. In this example, the second sub-set 16' has N lines 14 of display pixels. The second sub-set 16' of the first plurality of lines 14 of display pixels is offset from the first sub-set 16 of the first plurality of lines 14 of display pixels. In this example, the second sub-set 16' is shifted one line to the right to a nearest neighbour line 14.

The order in which the N lines 34 of image pixels is mapped to a sub-set 16, 16' remains the same in both modes.

Figure 6A:
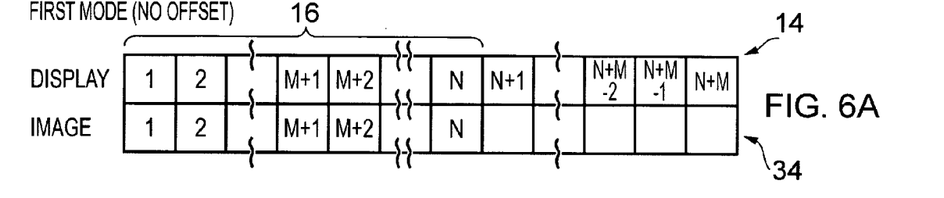
FIGS. 6A and 6B illustrate an example of mapping an image to a display in accordance with a first mapping mode and a second mapping mode with an arbitrary offset.

FIG. 6A, illustrates a mapping in the first mode of N lines 34 of image pixels to a first sub-set 16 of the first plurality of lines 14 of display pixels. In this example, the first plurality of lines 14 of display pixels has N+M lines 14 of display pixels and the first sub-set 16 has N lines 14 of display pixels.

Figure 6B:
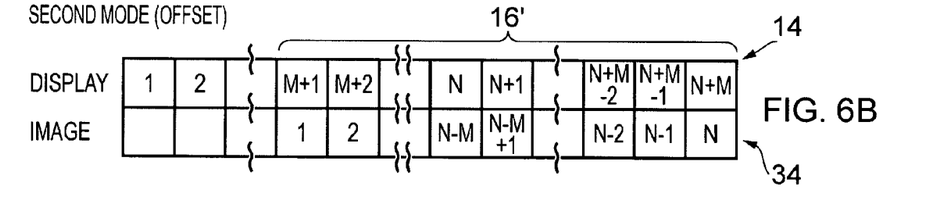

FIG. 6B, illustrates a mapping in the second mode of the N lines 34 of image pixels illustrated in FIG. 6A to a different second sub-set 16' of the first plurality of lines 14 of display pixels. In this example, the second sub-set 16' has N lines 14 of display pixels. The second sub-set 16' of the first plurality of lines 14 of display pixels is offset from the first sub-set 16 of the first plurality of lines 14 of display pixels. In this example, the second sub-set 16' is shifted an offset value M lines to the right. In this example, M may be any positive valued number but it will be appreciated that in other different implementations it may be negative.

In FIGS. 5A, 5B, 6A and 6B, each of the N lines 34 of image pixels of an image 30 displayed in the first mode is offset from each of the respective N lines of image pixels of the image 30 displayed in the second mode. That is, the offset is applied universally. The order in which the N lines 34 of image pixels are mapped to a sub-set 16, 16' remains the same in both modes. As all of the pixels are equivalent each of the lines of pixels is offset to its nearest neighbour line of equivalent pixels.

In FIGS. 7A, 7B, 8A, 8B, 8C the offset is applied selectively. In these examples, some but not all of the N lines 34 of image pixels for an image 30 displayed in the first mode are offset from the corresponding N lines of image pixels for the image 30 displayed in the second mode. The order in which the N lines 34 of image pixels are mapped to a sub-set of the lines of display pixels changes between the first mode and the second mode.

The lines of pixels that are offset, are offset to a line of equivalent pixels (e.g. same color). The offset may be to nearest neighbour line of equivalent pixels.

The offset of the second sub-set 16' of the first plurality of lines 14 of display pixels from the first sub-set 16 of the first plurality of lines 14 of display pixels, maps image pixels that would have been mapped to a particular line of display pixels in the first mode to a different line of display pixels in the second mode. The different line 14 of display pixels is, in this example, a nearest line 14 of display pixels that has a color that is the same as a color of the particular line of display pixels.

Figure 7A:
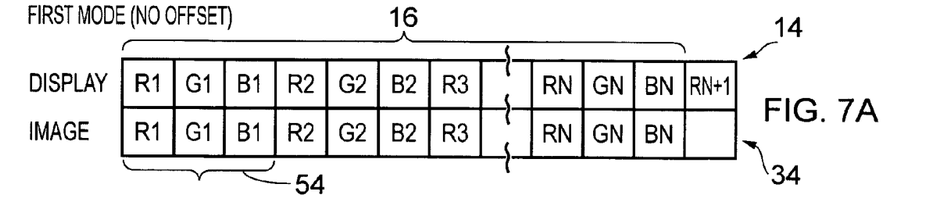
FIGS. 7A and 7B illustrate an example of mapping an image to a color display in accordance with a first mapping mode and a second mapping mode.

FIG. 7A, illustrates a mapping in the first mode of N lines 34 of image pixels to a first sub-set 16 of the first plurality of lines 14 of display pixels. In this example, there are N/3 groups 54 of lines 14 of display pixels and then at one end an additional line of display pixels. Each group 54 has in order a line 14 of red (R) display pixels, a line 14 of green (G) display pixels and a line 14 of blue (B) display pixels. The additional line of display pixels at the end corresponds to the first line of display pixels in the first group 54 of display pixels and is a line 14 of red (R) display pixels. The first plurality of lines 14 of display pixels has N+1 lines 14 of display pixels and the first sub-set 16 has N lines 14 of display pixels.

Figure 7B:
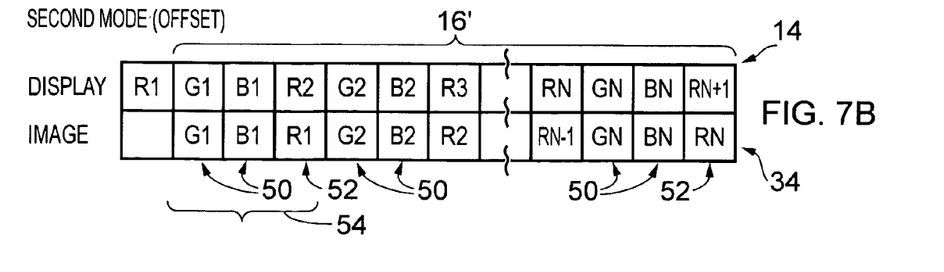

FIG. 7B, illustrates a mapping in the second mode of the N lines 34 of image pixels illustrated in FIG. 7A to a second sub-set 16' of the first plurality of lines 14 of display pixels. In this example, the second sub-set 16' has N lines 14 of display pixels. The second sub-set 16' of the first plurality of lines 14 of display pixels is offset from the first sub-set 16 of the first plurality of lines 14 of display pixels. In this example, the second sub-set 16' is shifted one line to the right to a nearest neighbour line.

The order in which the N lines 34 of image pixels are mapped to a sub-set 16, 16' of the lines of display pixels changes between the first mode (FIG. 7A) and the second mode (FIG. 7B).

The set 50 of lines 14 of display pixels are invariant and the mapping of lines 34 of image pixels to the set 50 of lines of display pixels does not change between the first mode (FIG. 7A) and the second mode (FIG. 7B).

The set 52 of lines 14 of display pixels are non-invariant and the mapping of lines 34 of image pixels to the set 50 of lines of display pixels does change between the first mode (FIG. 7A) and the second mode (FIG. 7B).

Each of the N lines of image pixels for a first color (red) of an image displayed in the second mode is offset from each of the respective N lines of image pixels for the first color of the image displayed in the first mode The lines of pixels that are offset, are offset to a line of equivalent pixels (e.g. same color). In the illustrated example, the offset is to a nearest neighbour line of equivalent pixels.

In the first mode (FIG. 7A), each group 54 has in order a line 14 of red (R) display pixels, a line 14 of green (G) display pixels and a line 14 of blue (B) display pixels.

In the second mode (FIG. 7B), each group 54 has in order a line 14 of a line 14 of green (G) display pixels and a line 14 of blue (B) display pixels and red (R) display pixels. That is the color order with a group 54 has changed but the composite color has not, that is, each group 54 still has 1 red, 1 green and 1 blue.

Figure 8A:
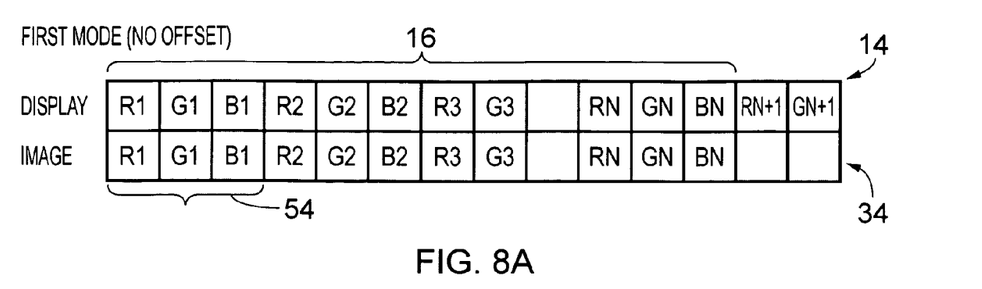
FIGS. 8A, 8B and 8C illustrate an example of mapping an image to a color display in accordance with a first mapping mode, a second mapping mode with a first offset and a second mapping mode with a second offset.

FIG. 8A, illustrates a mapping in the first mode of N lines 34 of image pixels to a first sub-set 16 of the first plurality of lines 14 of display pixels. In this example, there are N/3 groups 54 of lines 14 of display pixels and an additional two lines of display pixels. Each group 54 has in order a line 14 of red (R) display pixels, a line 14 of green (G) display pixels and a line 14 of blue (B) display pixels. The additional lines of display pixels corresponds to the first two lines of display pixels in the first group 54 of display pixels and is a line 14 of red (R) display pixels followed by a line 14 of blue (B) display pixels. The first plurality of lines 14 of display pixels has N+2 lines 14 of display pixels and the first sub-set 16 has N lines 14 of display pixels.

Figure 8B:
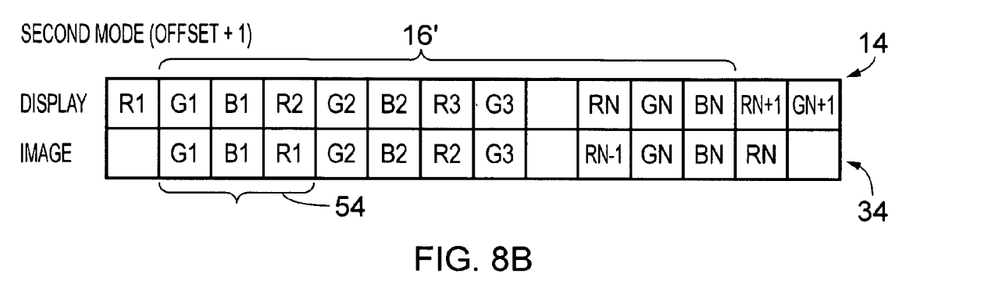

FIG. 8B, illustrates a mapping in the second mode with offset +1 of the N lines 34 of image pixels illustrated in FIG. 8A to a second sub-set 16' of the first plurality of lines 14 of display pixels. In this example, the second sub-set 16' has N lines 14 of display pixels. The second sub-set 16' of the first plurality of lines 14 of display pixels is offset from the first sub-set 16 of the first plurality of lines 14 of display pixels. In this example, the second sub-set is shifted one line to the right to a nearest neighbour line.

The order in which the N lines 34 of image pixels are mapped to a sub-set of the lines 14 of display pixels changes between the first mode (FIG. 8A) and the second mode (FIG. 8B).

For some lines of pixels (green and blue) the mapping of lines 34 of image pixels to the lines 14 of display pixels does not change between the first mode (FIG. 7A) and the second mode (FIG. 7B). For other lines 34 of image pixels (red) the mapping of lines 34 of image pixels to the lines 14 of display pixels does change between the first mode (FIG. 8A) and the second mode (FIG. 8B).

Each of the N lines 34 of image pixels for a first color (red) of an image displayed in the first mode is offset from each of the respective N lines 34 of image pixels for the first color of the image displayed in the second mode The lines of pixels that are offset, are offset to a line of equivalent pixels (e.g. same color). In the illustrated example, the offset is to a nearest neighbour line of equivalent pixels.

In the first mode (FIG. 8A), each group 54 has in order a line 14 of red (R) display pixels, a line 14 of green (G) display pixels and a line 14 of blue (B) display pixels.

In the second mode with offset +1 (FIG. 8B), each group 54 has in order a line 14 of green (G) display pixels, a line 14 of blue (B) display pixels and a line 14 of red (R) display pixels.

Figure 8C:
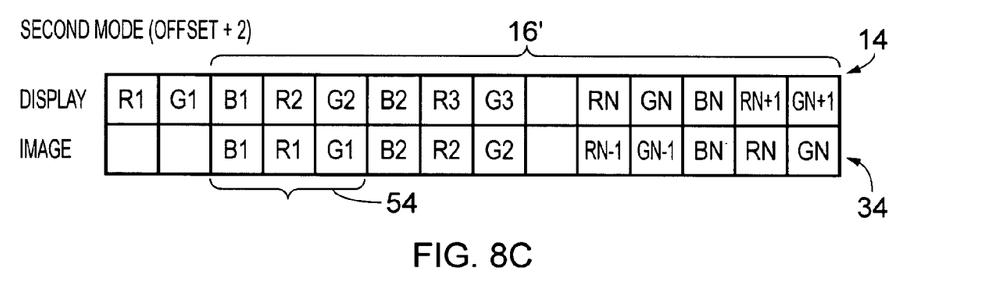

FIG. 8C, illustrates a mapping in the second mode with offset +2 of the N lines 34 of image pixels illustrated in FIG. 8A to a second sub-set 16' of the first plurality of lines 14 of display pixels. In this example, the second sub-set 16' has N lines 14 of display pixels. The second sub-set 16' of the first plurality of lines 14 of display pixels is offset from the first sub-set 16 of the first plurality of lines 14 of display pixels. In this example, the second sub-set is shifted two lines to the right to a nearest neighbour line.

The order in which the N lines 34 of image pixels are mapped to a sub-set 16, 16' of the lines of display pixels changes between the first mode (FIG. 8A) and the second mode with offset +2 (FIG. 8C).

For some lines of pixels (blue) the mapping of lines 34 of image pixels to the lines of display pixels does not change between the first mode (FIG. 8A) and the second mode with offset +2 (FIG. 8C). For other lines of pixels (red, green) the mapping of lines 34 of image pixels to the lines 14 of display pixels does change between the first mode (FIG. 8A) and the second mode with offset +2 (FIG. 8B).

Each of the N lines 14 of image pixels for a first color (red) of an image displayed in the first mode is offset from each of the respective N lines 34 of image pixels for the first color of the image displayed in the second mode The lines of pixels that are offset, are offset to a line of equivalent pixels (e.g. same color). In the illustrated example, the offset is to a nearest neighbour line of equivalent pixels.

Each of the N lines of image pixels for a second color (green of an image displayed in the first mode is offset from each of the respective N lines of image pixels for the second color of the image displayed in the second mode The lines of pixels that are offset, are offset to a line of equivalent pixels (e.g. same color). In the illustrated example, the offset is to a nearest neighbour line of equivalent pixels.

In the first mode (FIG. 8A), each group 54 has in order a line 14 of red (R) display pixels, a line 14 of green (G) display pixels and a line 14 of blue (B) display pixels.

In the second mode with offset +2 (FIG. 8C), each group 54 has in order a line 14 of blue (B) display pixels and a line 14 of red (R) display pixels, a line 14 of green (G) display pixels.

The description above for FIGS. 7A-7B and 8A-8C illustrates an example where the lines 14 of display pixels are arranged in equivalent groups 54. In the example of FIGS. 7A-7B and 8A-8C, the equivalent groups have the same proportion of red, green and blue. However, the lines 14 of display pixels within each group are not equivalent and although certain lines 14 of display pixels are retained within every group, the order of those lines 14 within the groups may be simultaneously changed across all groups 54 when a mode changes or an offset changes.

Figure 9:
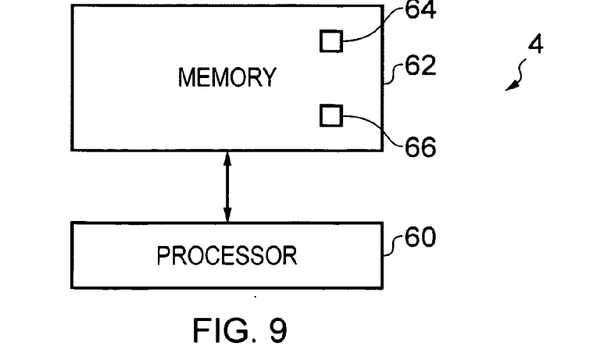
FIG. 9 illustrates an example of a display controller.

FIG. 9 illustrates one example of a possible display controller 4.

Implementation of the controller 4 can be in hardware alone (a circuit, a processor . . . ), have certain aspects in software including firmware alone or can be a combination of hardware and software (including firmware).

The controller 4 may be implemented using instructions that enable hardware functionality, for example, by using executable computer program instructions in a general-purpose or special-purpose processor that may be stored on a computer readable storage medium (disk, memory etc) to be executed by such a processor.

In this example, the display controller 4 comprises a processor 60 and a memory 62.

The processor 60 is configured to read from and write to the memory 62. The processor 60 may also comprise an output interface via which data and/or commands are output by the processor 60 and an input interface via which data and/or commands are input to the processor 60.

The memory 62 is configured to store one or more parameters 64 indicating the mapping mode(s). An interface 8 (FIG. 1) may be configured to enable an external apparatus to write the parameter 64 to the memory 62.

The parameter 64 may indicate the first or second mode and it may define an offset value by which the second sub-set 16' of the first plurality 18 of lines 14 of display pixels 12 is offset from the first sub-set 16 of the first plurality 18 of lines 14 of display pixels 12.

The memory 62 stores a computer program 66 comprising computer program instructions that control the operation of the apparatus 2 when loaded into the processor 60. The computer program instructions 66 provide the logic and routines that enables the apparatus to perform the methods illustrated and described. The processor 60 by reading the memory 62 is able to load and execute the computer program 66.

The apparatus 2 therefore comprises: at least one processor 60; and at least one memory 62 including computer program code 66, the at least one memory 62 and the computer program code 66 configured to, with the at least one processor 60, cause the apparatus 2 at least to perform:
reading a control parameter 64; and controlling display of an image 30 by mapping at least a portion of the image 30 to lines 14 of display pixels 12 of a first display 10 comprising display pixels 12 arranged as a first plurality 18 of lines 14 of display pixels 12 using a mapping mode defined by the control parameter 64. The first mapping mode, maps images 30 comprising N lines 34 of image pixels 32 to a first sub-set 16 of a first plurality 18 of lines 14 of display pixels 12, comprising N lines 14 of display pixels 12. The second mapping mode maps images 30 comprising N lines 34 of image pixels 32 to a second sub-set 16' of the first plurality 18 of lines 14 of display pixels 12, comprising N lines 14 of display pixels 12. The second sub-set 16' of the first plurality 18 of lines 14 of display pixels 12 is offset from the first sub-set 16 of the first plurality 18 of lines 14 of display pixels 12.

The computer program may arrive at the apparatus 2 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 66. The delivery mechanism may be a signal configured to reliably transfer the computer program 66. The apparatus 2 may propagate or transmit the computer program 66 as a computer data signal.

Although the memory 62 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

Figure 10:
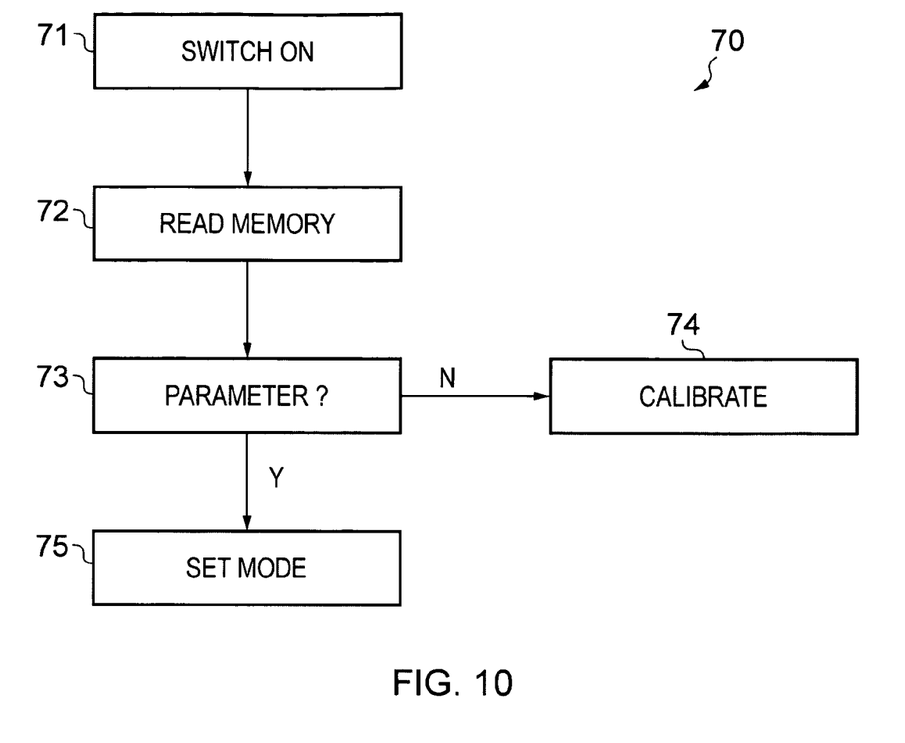
FIG. 10 illustrates a method for setting a mapping mode.

FIG. 10 illustrates a method 70 that may be performed whenever the apparatus 2 is switched on or whenever the apparatus 2 is switched to controlling multiple displays as a combined display.

At block 71 the trigger event occurs. In this example, the trigger event is switching the apparatus 2 on. In other examples, the trigger event may be switching to controlling multiple displays as a combined display.

Next at block 72, automatically the display controller 4 attempts to read the control parameter 64 from the memory 62.

Next at block 73 it is determined automatically whether the read operation has been successful. If the memory 62 stores the control parameter 64, and it has been read then the method continues to block 75 where a display control mode is automatically set. If the memory 62 does not store the control parameter 64, then the method branches to block 74. At block 74 calibration of a display control mode is automatically initiated to determine a control parameter 64 for storage in the memory 62.

At block 75, the display controller 4 controls display of an image by mapping at least a portion of the image to lines 14 of display pixels of a first display 10 comprising display pixels 12 arranged as a first plurality 18 of lines 14 of display pixels 12 using a mapping mode defined by the control parameter 64.

If the mapping mode is the first mapping mode, then the display controller 4 maps images comprising N lines 34 of image pixels to a first sub-set 16 of a first plurality of lines 14 of display pixels. The first sub-set 16 has N lines of display pixels.

If the mapping mode is the second mapping mode, then the display controller 4 maps images comprising N lines 34 of image pixels to a second sub-set 16' of the first plurality of lines 14 of display pixels. The second sub-set 16' has N lines of display pixels. The second sub-set 16' of the first plurality of lines of display pixels is offset from the first sub-set 16 of the first plurality of lines of display pixels. The offset value may be determined by the control parameter 64.

Figure 11:
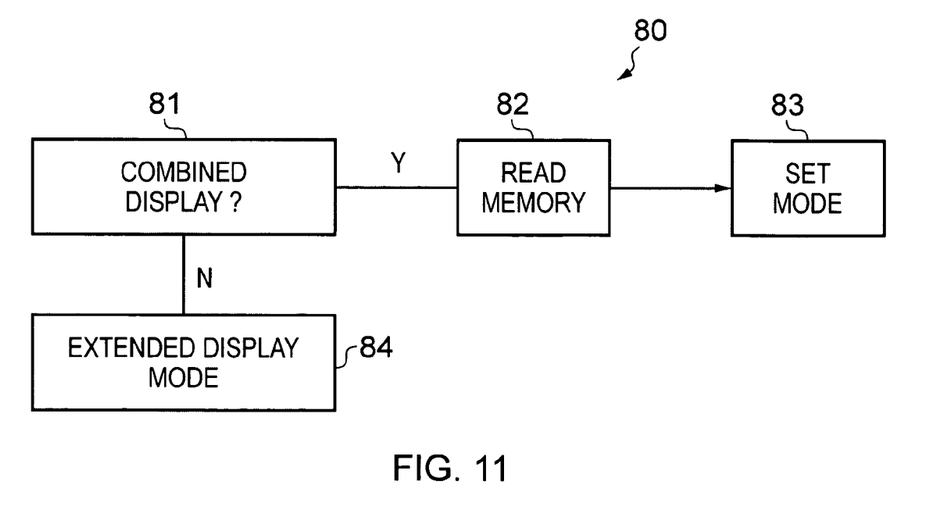
FIG. 11 illustrates an alternative for method setting a mapping mode.

FIG. 11 illustrates a method 80 that results in different outcomes depending on whether or not the apparatus 2 is controlling multiple displays as a combined display.

At block 81, it is determined whether or not the apparatus 2 should control multiple displays as a combined display.

If a combined display is not required, the method moves to block 84 where the display controller 4 enters the extended display mode.

If a combined display is required, the method moves to block 82 where the display controller 4 reads the control parameter 64 from the memory 62.

At block 84, the display controller is configured to display images in only the first display by mapping the images to all of the first plurality of lines 14 of display pixels.

At block 83, the process is similar to that previously described with reference to block 75.

Figure 12A:
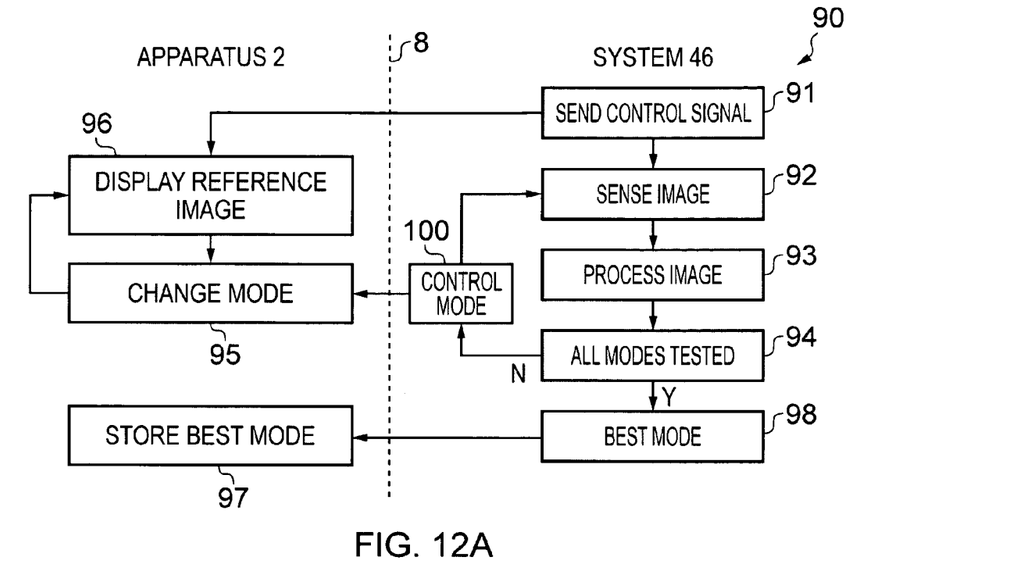
FIGS. 12A and 12B illustrate alternative methods for calibrating a mapping mode at manufacture.

FIG. 12A illustrates a calibration method 90 that may be performed at manufacture of the apparatus 2. The apparatus 2 comprises an external interface 8 for receiving external signals from the system 46.

A calibration system 46 controls the apparatus 2 to determine a control parameter 64 for storage in the memory 62.

At block 91, the calibration system 46 sends a calibration control signal to the apparatus 2.

At block 96, the apparatus responds to receiving the calibration control signal by displaying a reference image on the combined display. The display controller 4 controls the first display 10 and the second display 20 to display a predetermined reference image that extends across the interface between the first display 10 and the second display 20. The image may for example comprise one or more predetermined items that straddle the first display 10 and the second display 20. An example of an item is a straight line marker 40 that is parallel to the lines 14 of display pixels.

The display controller 4 initially controls display of an image according to the first mapping mode. In the first mapping mode, the display controller 4 maps images comprising N lines of image pixels to a first sub-set 16 of a first plurality of lines 14 of display pixels. The first sub-set 16 has N lines 14 of display pixels.

Subsequently, at block 95 the method iterates and display controller 4 will change the mapping mode to the second mapping mode.

Then at block 96, the display controller 4, in the second mapping mode, maps the reference image comprising N lines of image pixels to a second sub-set 16' of the first plurality of lines 14 of display pixels. The second sub-set 16' has N lines 14 of display pixels.

The second sub-set 16' of the first plurality of lines 14 of display pixels is offset from the first sub-set 16 of the first plurality of lines of display pixels. The offset value has an initial value.

Subsequently, at block 95 the method iterates again and display controller 4 will change the offset value used in the second mapping mode.

Then at block 96, the display controller 4, in the second mapping mode, maps the reference image comprising N lines of image pixels to a new second sub-set 16' of the first plurality of lines 14 of display pixels. The new second sub-set 16' comprises N lines 14 of display pixels.

The second sub-set 16' of the first plurality of lines 14 of display pixels is offset from the first sub-set 16 of the first plurality of lines 14 of display pixels according to the new offset value.

In this way, by iterating blocks 95 and 96, all of the offset values of the second mapping mode may be used to display a reference image.

Meanwhile at the system 46, at block 92 a camera sensor is used to capture an image of the combined display displaying the reference image.

Next at block 93, the system 46 processes the captured image to determine a value for the misalignment between the first display 10 and the second display 20. This may be achieved by using the reference image to render a straight line marker and by measuring the lateral separation between the portion of the straight line marker displayed in the first display 10 and the portion of the same straight line marker displayed in the second display 20.

Next at block 94 it is determined whether or not all of the available offsets for the second mode have been tested. If all of the available offsets have not yet been tested then the system 46 provides a control signal at block 100 to the apparatus 2 to iterate the process and change the mode or change the offset for the second mode as appropriate. The method at the system 46 then returns to block 92.

If all of the available offsets have been tested then the method moves to block 98 where it is determined which of the first mode or the second mode with different offsets produces an image with the smallest misalignment value. That mode is determined as the best mode and it is identified, with offset where appropriate, to the apparatus 2.

Then at block 97, the apparatus 2 stores in memory 62 a control parameter 64 that defines the best mode, with offset where appropriate.

Figure 12B:
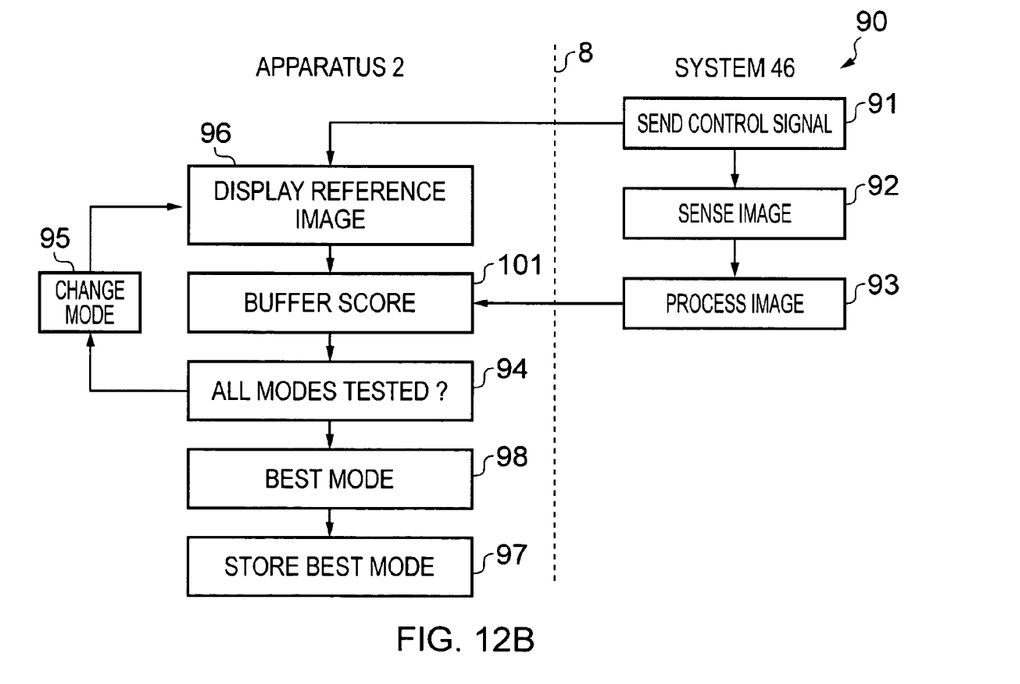

FIG. 12B illustrates a calibration method 90 that may be performed at manufacture of the apparatus 2. The method has similarities to the method 90 illustrated in FIG. 12A, however, in this method although the system 46 performs blocks 91, 92 and 93 as in FIG. 12A, blocks 94 and 98 are performed by the apparatus 2. In this method the apparatus 2 performs blocks 95, 96 and 97 and blocks 94 and 98.

At block 91, the calibration system 46 sends a calibration control signal to the apparatus 2.

At block 96, the apparatus responds to receiving the calibration control signal by displaying a reference image on the combined display. The display controller 4 controls the first display 10 and the second display 20 to display a reference image that extends across the interface between the first display 10 and the second display 20. The image may for example comprise one or more straight line markers 40 that are parallel to the lines of display pixels.

The display controller 4 initially controls display of an image according to the first mapping mode. In the first mapping mode, the display controller 4 maps images comprising N lines of image pixels to a first sub-set 16 of a first plurality of lines of display pixels.

Subsequently, at block 95 the method automatically iterates and display controller 4 will change the mapping mode to the second mapping mode and the offset of the second mapping mode as previously described with reference to FIG. 12A. By iterating blocks 95 and 96, all of the offset values of the second mapping mode may be used to display a reference image.

Meanwhile at the system 46, at block 92 a camera sensor is used to capture an image of the combined display displaying the reference image.

Next at block 93, the system 46 processes the captured image to determine a value for the misalignment between the first display 10 and the second display 20. This may be achieved by using the reference image to render a straight line marker and by measuring the lateral separation between the portion of the straight line marker displayed in the first display 10 and the portion of the same straight line marker displayed in the second display 20. The misalignment value is sent to the apparatus 2.

The apparatus 2, at block 94, buffers the received misalignment values in temporary storage.

Next at block 94 it is determined whether or not all of the available offsets for the second mode have been tested. If all of the available offsets have not yet been tested then the apparatus 2 iterates the process to block 95 and changes the mode or changes the offset for the second mode as appropriate.

If all of the available offsets have been tested then the method moves to block 98 where it is determined which of the first mode or the second mode with different offsets has the smallest buffered misalignment value. That mode is determined as the best mode.

Then at block 97, the apparatus 2 stores in memory 62 a control parameter 64 that defines the best mode, with offset where appropriate.

Figure 13A:
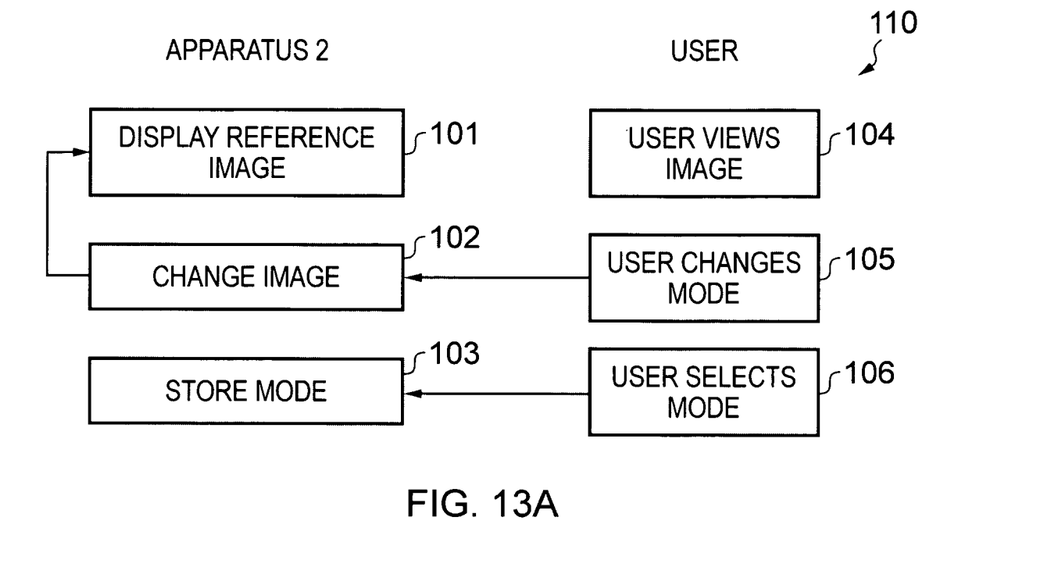
FIGS. 13A and 13B illustrate alternative methods for calibrating a mapping mode post-manufacture.

FIG. 13A illustrates a calibration method 90 that may be performed post-manufacture of the apparatus 2 by a user.

At block 101, the apparatus 2 displays a reference image on the combined display. The display controller 4 controls the first display 10 and the second display 20 to display a reference image that extends across the interface between the first display 10 and the second display 20. The image may for example comprise at item such as one or more straight line markers 40 that are parallel to the lines of display pixels.

The display controller 4 initially controls display of an image according to the first mapping mode. In the first mapping mode, the display controller 4 maps images comprising N lines 34 of image pixels to a first sub-set 16 of a first plurality of lines 14 of display pixels. The first sub-set has N lines 14 of display pixels.

Subsequently, at block 102 the method iterates and the display controller 4 will change the mapping mode to the second mapping mode.

Then at block 101, the display controller 4, in the second mapping mode, maps the reference image comprising N lines of image pixels to a second sub-set 16' of a first plurality of lines of display pixels. The second sub-set 16' has N lines of display pixels.

The second sub-set 16' of the first plurality of lines of display pixels is offset from the first sub-set 16 of the first plurality of lines of display pixels. The offset value has an initial value.

Subsequently, at block 102 the method iterates again and display controller 4 will change the offset value used in the second mapping mode.

Then at block 101, the display controller 4, in the second mapping mode, maps the reference image comprising N lines of image pixels to a new second sub-set 16' of the first plurality of lines 14 of display pixels. the new second sub-set 16' has N lines of display pixels.

The new second sub-set 16' of the first plurality of lines 14 of display pixels is offset from the first sub-set 16 of the first plurality of lines 14 of display pixels according to the new offset value.

In this way, by iterating blocks 101 and 102, all of the offset values of the second mapping mode may be used to display a reference image.

Meanwhile a user, at block 104, views the displayed reference images. At block 105, the user provides a command to the apparatus 2, for example through a user input device 6, that causes the block 102 to iterate the method and change the mode or change the offset for the second mode as appropriate.

Once the user has determined which of the first mode or the second mode with different offsets has the smallest misalignment, the user can select at block 106 that mode as the best mode.

Then at block 103, the apparatus 2 stores in memory 62 a control parameter 64 that defines the best mode, with offset where appropriate.

Figure 13B:
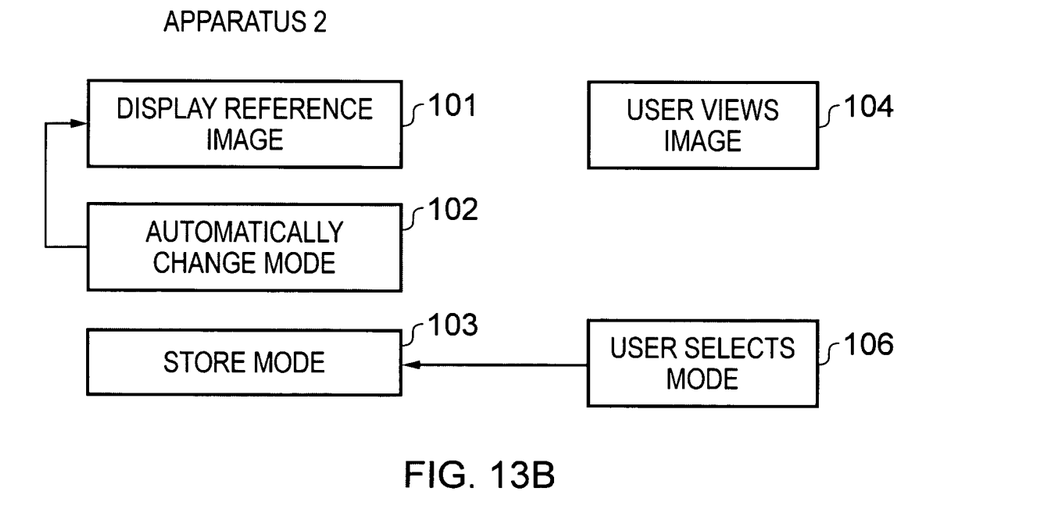

FIG. 13B illustrates a calibration method 90 that may be performed post-manufacture of the apparatus 2 by a user. The method 90 is similar to the method 90 illustrated in FIG. 13A.

It differs in that the, at block 102 the method iterates automatically without user input. In this way, by iterating blocks 101 and 102, all of the offset values of the second mapping mode may be used to display a reference image. Otherwise the methods are similar and similar references indicate similar blocks.

Figure 14:
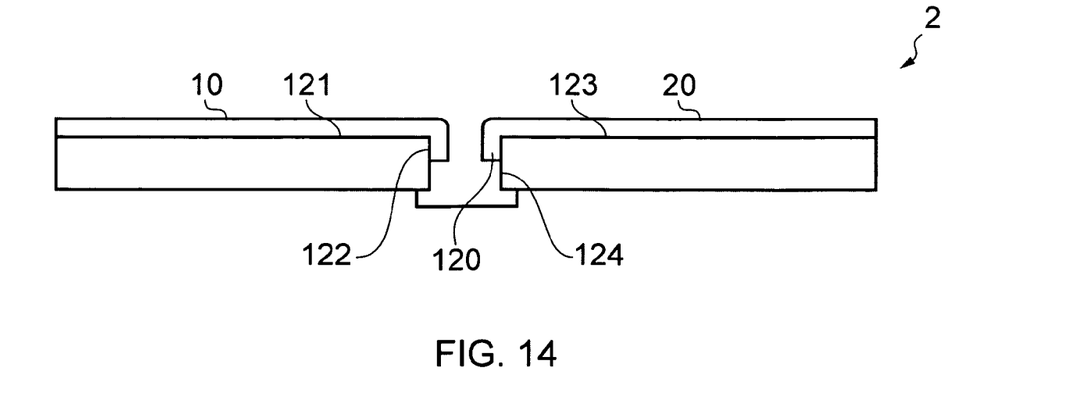
FIG. 14 illustrates one example of an apparatus comprising a first display and a second display.

FIG. 14 illustrate an apparatus 2 that is able to perform the method of FIG. 12A or 12B itself. That is it is able to perform the functions of the system 46. In this embodiment, the second display 20 additionally comprises optical sensors 120 which are used to capture an image at block 92.

In the illustrated example, the first display 10 is flexible and extends over an upper surface 121 and at least part of a first side surface 122 of the apparatus 2. The second display 20 is flexible and extends over an upper surface 123 and at least part of a second side surface 124 of the apparatus 2. The first side surface 122 and the second side surface 124 oppose each other.

The optical sensors 124 of the second display 20 may be located on the second side surface 124 opposing display pixels 12 of the first display 10 on the first side surface 122.

Figure 15:
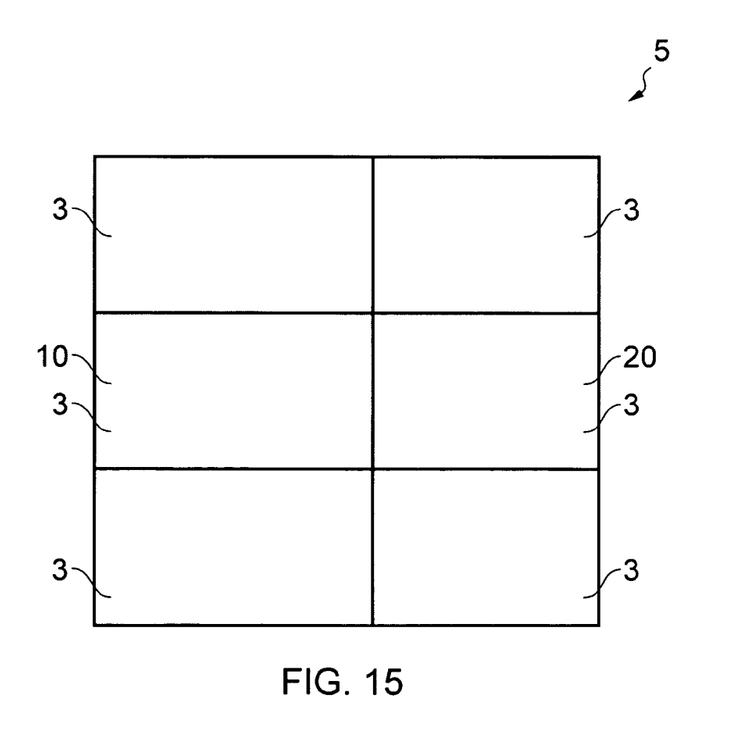
FIG. 15 illustrates a combined display formed from tessellated smaller displays which are controlled by the display controller.

FIG. 15 illustrates that the display controller 4 may control multiple displays 3 as a combined display that operate in concert to display an image. In this example, the displays 3 are tessellated in a n row by m column array 5.

The compensation for misalignment of displays using modes for the display controller 4 described above may be applied at any interface between displays 3. That is, for any pair of adjacent displays 3 one display may be considered to be the first display 10 and one display may be considered to be the second display 20.

It will therefore be appreciated that although in the foregoing discussion, the lines 14 of display pixels have been assumed to be the columns of display pixels 12 in other examples they may be the rows of display pixels 12.

The illustration of a particular order to the blocks in FIG. 10, 11, 12A, 12B, 13A or 13B does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a first display comprising display pixels arranged as a first plurality of lines of display pixels;
a second display comprising display pixels arranged as a second plurality of lines of display pixels, wherein the first display and the second display are arranged or are configured to be arranged adjacent to each other to form a combined display; and
a display controller configured to control display of an image on the combined display by simultaneously mapping a first portion of the image to lines of display pixels of the first display and a second portion of the image different from the first portion of the image to lines of display pixels of the second display, said first and second portions of the image being non-overlapping and contiguous, and together forming all of the image,
wherein the display controller is configured to operate at least the first display in at least a first mode or a second mode, said display controller being calibrated to select a best mode to display said first portion of said image on the first display from said at least first mode or second mode based on the appearance of a predetermined reference image on the combined display to correct for misalignment between the first display and the second display,
wherein, in the first mode, the display controller is configured to map the first portion of the image comprising N lines of image pixels to a first sub-set of the first plurality of lines of display pixels on the first display, comprising N lines of display pixels, and
wherein, in the second mode, the display controller is configured to map the first portion of the image comprising N lines of image pixels to a second sub-set of the first plurality of lines of display pixels on the first display, comprising N lines of display pixels, wherein the second sub-set of the first plurality of lines of display pixels is offset from the first sub-set of the first plurality of lines of display pixels.

2. An apparatus as claimed in claim 1, further comprising a memory configured to store a parameter indicating the first or second mode.

3. An apparatus as claimed in claim 2, wherein when the apparatus is to be used as a combined display, the memory is read automatically and the mode indicated by the stored parameter read from the memory is automatically enabled.

4. An apparatus as claimed in claim 2, wherein when the apparatus is switched on the memory is read automatically and if the first mode or the second mode is not indicated by a stored parameter read from the memory then automatically enabling a calibration mode to determine a parameter indicating the first or second mode for storage in the memory.

5. An apparatus as claimed in claim 1, wherein the offset of the second sub-set of the first plurality of lines of display pixels from the first sub-set of the first plurality of lines of display pixels, maps image pixels that would have been mapped to a particular line of display pixels in the first mode to a different line of display pixels in the second mode, wherein the different line of display pixels is equivalent to the particular line of display pixels.

6. An apparatus as claimed in claim 5, wherein the different line of display pixels is a nearest equivalent to the particular line of display pixels.

7. An apparatus as claimed in claim 1, further comprising a memory and an external interface for receiving a first external signal to enable display of an image and a second external signal to enable storage of a parameter in the memory.

8. An apparatus as claimed in claim 1, further comprising a memory and a user interface to enable storage of a parameter in the memory.

9. An apparatus as claimed in claim 1, further comprising optical sensors wherein output from the sensors used to enable storage of a parameter in the memory.

10. An apparatus as claimed in claim 1, wherein each of the N lines of image pixels of an image displayed in the first mode is offset from each of the respective N lines of image pixels of the image displayed in the second mode.

11. An apparatus as claimed in claim 1, wherein some, but not all, of the N lines of image pixels for an image displayed in the first mode are offset from the corresponding N lines of image pixels for the image displayed in the second mode.

12. An apparatus as claimed in claim 1, wherein each of the N lines of image pixels for a first color of an image displayed in the first mode is offset from each of the respective N lines of image pixels for the first color of the image displayed in the second mode; each of the N lines of image pixels for a second color of an image displayed in the first mode is not offset from each of the respective N lines of image pixels for the second color of the image displayed in the second mode; and each of the N lines of image pixels for a third color of an image displayed in the first mode is not offset from each of the respective N lines of image pixels for the third color of the image displayed in the second mode.

13. An apparatus as claimed in claim 1, wherein the display controller is configured to display, in an extended display mode, images in only the first display by mapping the images simultaneously to all of the first plurality of lines of display pixels.

14. A method comprising:
reading a control parameter, said control parameter being obtained by calibrating a display controller to select a mapping mode for displaying a first portion of an image on a first display of a combined display, said combined display being formed by the first display and a second display arranged adjacent to the first display, based on the appearance of a predetermined reference image on the combined display to correct for misalignment between the first display and the second display;

controlling display of the first portion of the image by mapping the first portion of the image to lines of display pixels of the first display comprising display pixels arranged as a first plurality of lines of display pixels using the mapping mode defined by the control parameter; and controlling display of the second portion of the image by mapping a second portion of the image different from the first portion of the image to lines of display pixels of a second display comprising display pixels arranged as a second plurality of lines of display pixels, said first and second portions of the image being non-overlapping and contiguous, and together forming all of the image, wherein a first mapping mode maps the first portion of the image comprising N lines of image pixels to a first sub-set of a first plurality of lines of display pixels on the first display, comprising N lines of display pixels, and a second mapping mode maps the first portion of the image comprising N lines of image pixels to a second sub-set of the first plurality of lines of display pixels on the first display, comprising N lines of display pixels, wherein the second sub-set of the first plurality of lines of display pixels is offset from the first sub-set of the first plurality of lines of display pixels.

15. A method as claimed in claim 14, wherein controlling display of the image comprising mapping at least a different portion of the image to lines of display pixels of the second display uses a mapping mode defined by the control parameter, wherein one mapping mode, maps images comprising N lines of image pixels to a first sub-set of the second plurality of lines of display pixels, comprising N lines of display pixels, and another mapping mode maps images comprising N lines of image pixels to a second sub-set of the second plurality of lines of display pixels, comprising N lines of display pixels, wherein the second sub-set of the second plurality of lines of display pixels is offset from the first sub-set of the second plurality of lines of display pixels.

16. A method as claimed in claim 14, wherein each of N lines of image pixels of an image when displayed in the first mapping mode is offset from each of the respective N lines of image pixels of the image when displayed in the second mapping mode.

17. A method as claimed in claim 14, wherein some, but not all, of N lines of image pixels for an image when displayed in the first mode are offset from the corresponding N lines of image pixels for the image when displayed in the second mode.

18. A method as claimed in claim 14 further comprising:
determining and storing the control parameter that defines a mapping mode for subsequent control of at least the first display.

19. An apparatus comprising:
at least one processor; and
at least one memory including computer program code, the at least one memory and the computer program code configured, with the at least one processor, to cause the apparatus at least to perform:
reading a control parameter, said control parameter being obtained by calibrating the apparatus to select a mapping mode for displaying a first portion of an image on a first display of a combined display, said combined display being formed by the first display and a second display arranged adjacent to the first display, based on the appearance of a predetermined reference image on the combined display to correct for misalignment between the first display and the second display;

controlling display of the first portion of the image by mapping the first portion of the image to lines of display pixels of the first display comprising display pixels arranged as a first plurality of lines of display pixels using the mapping mode defined by the control parameter; and controlling display of the second portion of the image by mapping a second portion of the image different from the first portion of the image to lines of display pixels of a second display comprising display pixels arranged as a second plurality of lines of display pixels, said first and second portions of the image being non-overlapping and contiguous, and together forming all of the image, wherein a first mapping mode maps the first portion of the image comprising N lines of image pixels to a first sub-set of a first plurality of lines of display pixels on the first display, comprising N lines of display pixels, and a second mapping mode maps the first portion of the image comprising N lines of image pixels to a second sub-set of the first plurality of lines of display pixels on the first display, comprising N lines of display pixels, wherein the second sub-set of the first plurality of lines of display pixels is offset from the first sub-set of the first plurality of lines of display pixels.

\* \* \* \* \*